May 26, 1970            J. D. WALLACE            3,514,150
CAMPING TRAILER LIFT MECHANISM
Filed June 3, 1968            3 Sheets-Sheet 1
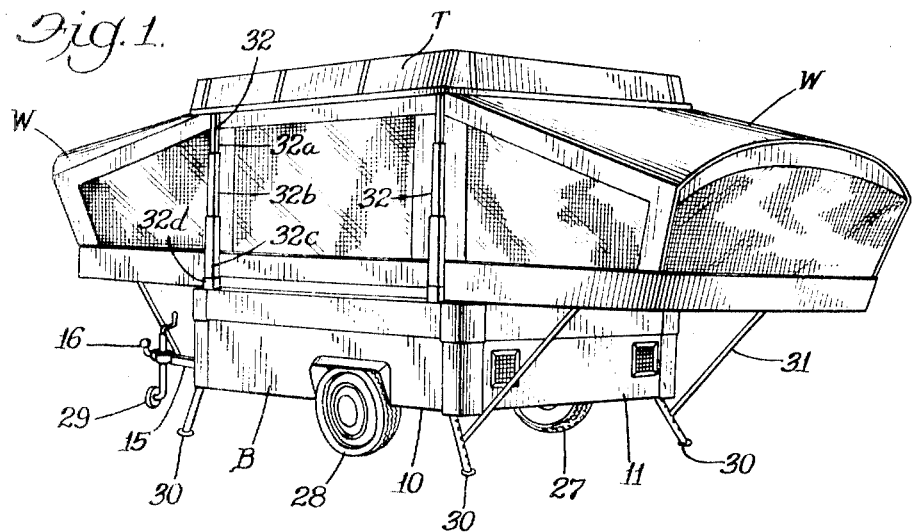
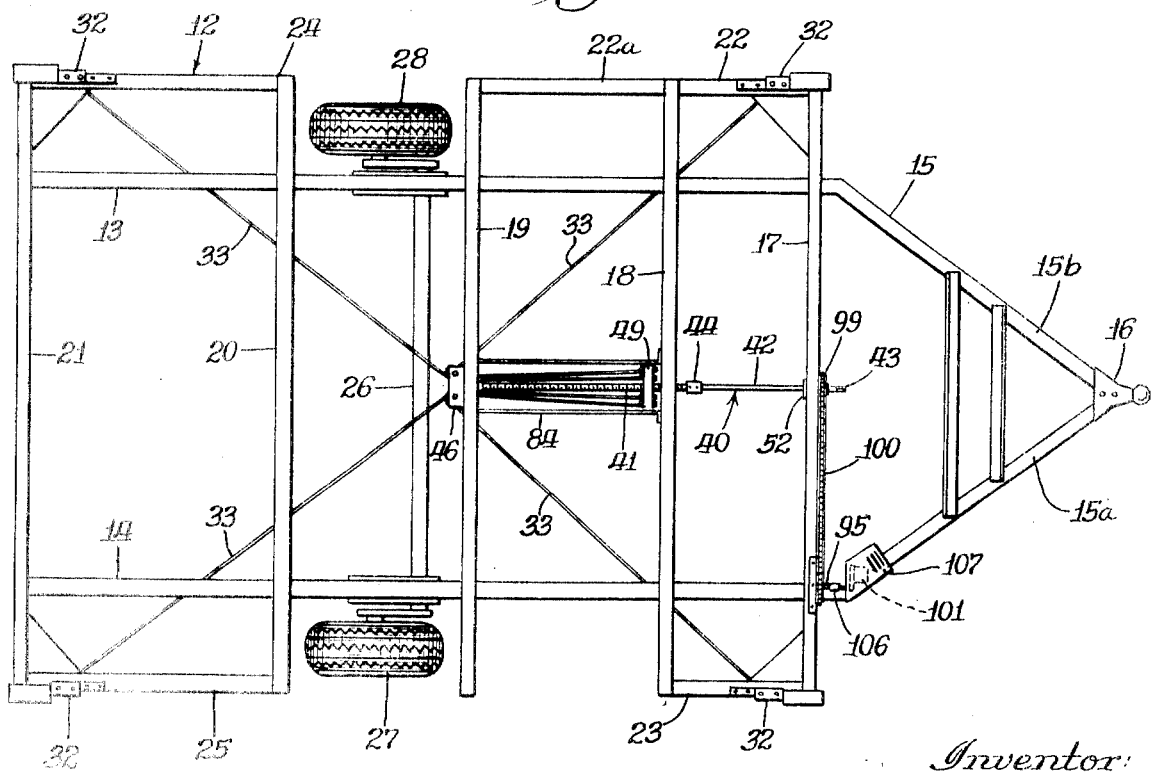
Inventor:
Joseph D. Wallace
By:
Dawson, Tilton, Fallon & Lungmus
Attys.

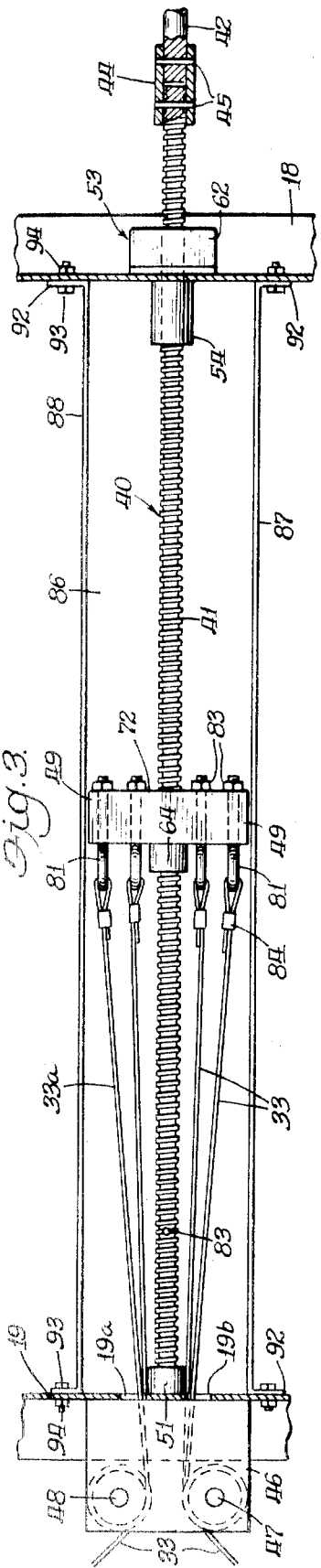

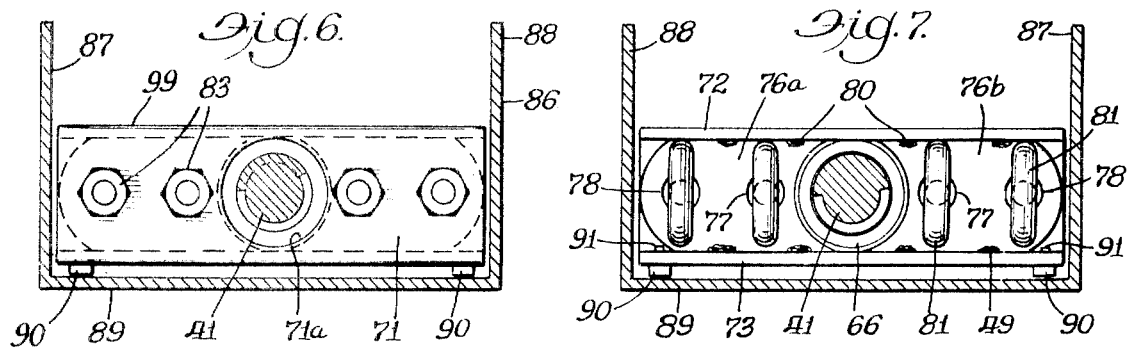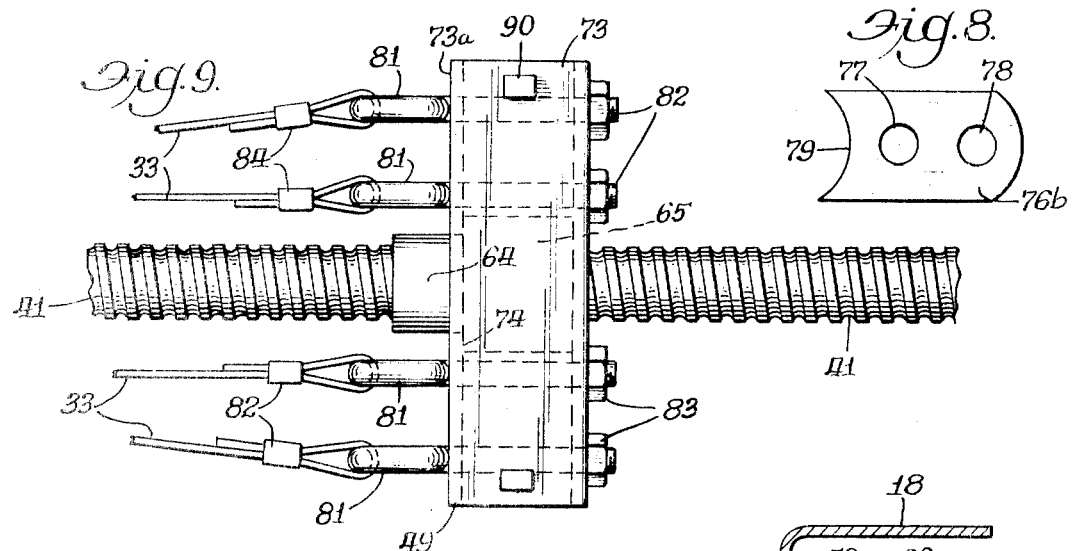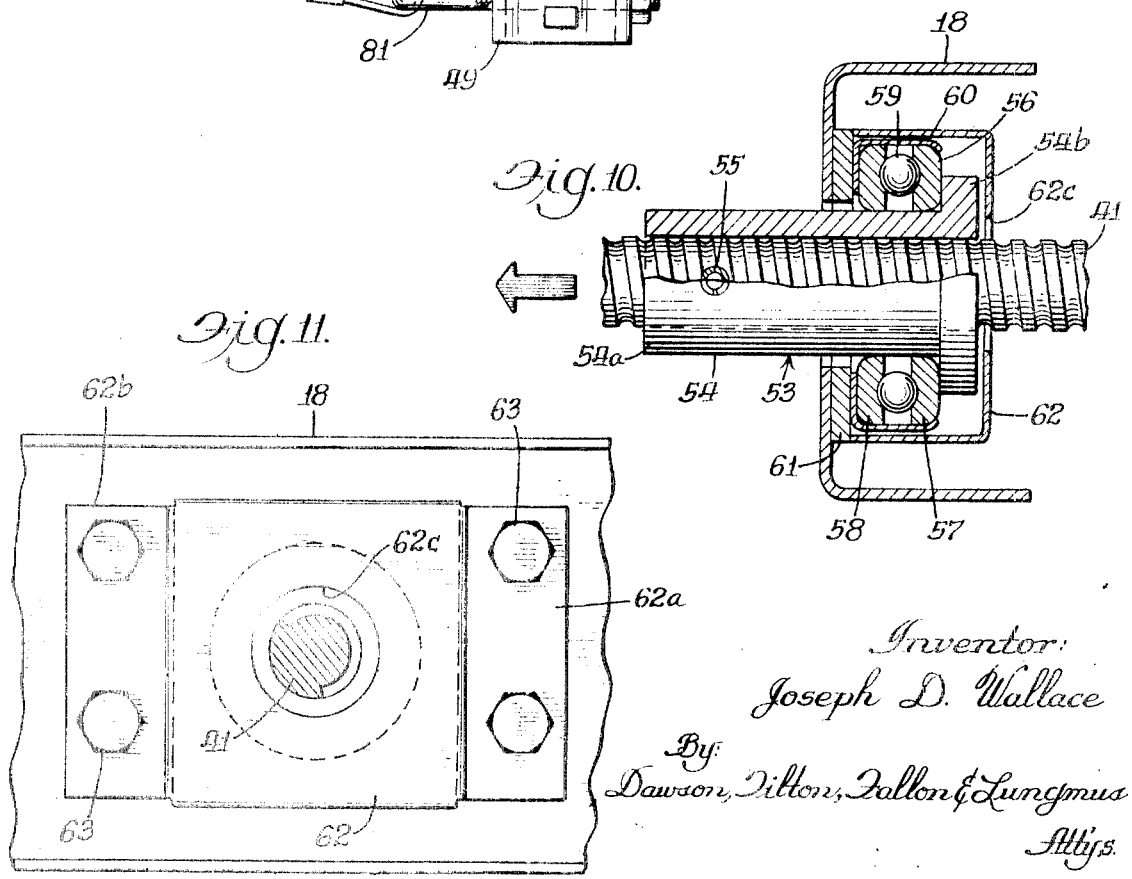

United States Patent Office 3,514,150
Patented May 26, 1970

3,514,150
CAMPING TRAILER LIFT MECHANISM
Joseph D. Wallace, Wichita, Kans., assignor to The Coleman Company, Inc., Wichita, Kans., a corporation of Kansas
Filed June 3, 1968, Ser. No. 733,888
Int. Cl. B60p 3/34
U.S. Cl. 296—23                           10 Claims

ABSTRACT OF THE DISCLOSURE

A cable drawing mechanism for use in combination with a camping trailer to raise and lower the top. The top, which forms a cover for the body in its lowered position is mounted on cable-operated telescopic corner posts and the operating cables extend inwardly from the lower post sections for connection to the cable drawing mechanism. The cable drawing mechanism includes a screw shaft which is rotatably mounted in the trailer frame. A nut is threadedly engaged with the shaft and a channel-shaped draw bar is secured to the nut in a manner which maintains the draw bar substantially perpendicular to the shaft. Eye hooks provided with threaded ends are inserted through openings in the channel and are secured against withdrawal by nuts received on the threaded end, and the end of each cable is looped through an eye hook and clamped. Rotation of the screw shaft in one direction advances the nut and draw bar along the shaft thereby drawing the cables to raise the top. Rotation of the screw shaft in the other direction allows the weight of the top to collapse the telescopic posts, returning the top to the lowered position.

Related application

This application is a continuation-in-part of my prior application entitled Camping Trailer Lift Mechanism, Ser. No. 696,941, filed Jan. 10, 1968.

Background

Camping trailers which travel in a collapsed, compact condition and are opened at the campsite by raising the roof and extending outwardly the ends or the sides have become increasingly popular in the United States in recent years, and are now in widespread use. As the size of these camping units has increased, and particularly where the size and weight of the top or roof has increased to the point where it is difficult for one person to raise the roof from travel position to camping position, there has been an increased need for mechanical lift mechanisms which will raise and lower the top in a positive manner with a minimum of time and effort. Since such camping trailers ordinarily have a perimetric body (rectangular or square) with corner posts for suporting the top, cable-operated telescopic posts provide a convenient device for raising and lowering the tops. The construction and operation of such telescopic posts is well known, as shown by Davis Pat. No. 133,017 and Newman Pat. No. 459,613. Bontrager Pat. No. 3,312,715 describes the use of such cable-operated telescopic posts for raising and lowering the roof of a trailer. However, certain problems have developed in the commercial use of such devices with camping trailers.

Since it is desirable to have the top or roof of the camping trailer raise and lower positively and uniformly, the operating cables from each corner post have been brought together and attached to a single main cable, which is tensioned by winding or unwinding it on a reel or winch mounted in front of the trailer body, for example, on the draw bars or tongue. The combination cable system of main cable and side cables has not proven as smooth and uniform in operation as would be desirable, the cable sections tending to stretch non-uniformly, causing canting of the top as it is raised and lowered, and/or raising of the top to less than its full height, as permitted by the maximum extension of the post sections.

Even if the cables stretch uniformly, it is desirable to provide some adjusting means to accommodate for any slack caused by stretching so that the top may always be raised to its full height.

Other problems relate to the safety of operation and to the ease and speed of operation. The exposed section of the main cable and the winch on which it is wrapped can be somewhat hazardous in operation, especially for women and children. It would be desirable to provide an operating mechanism which is wholly contained within the body; which is protected from water, mud, and objects which can be thrown up from the roadbed; and which provides a safer, smoother, and more uniform actuation.

Summary

The foregoing problems have been solved by the development of an operating mechanism for camping trailers equipped with telescopic corner posts. The mechanism includes a screw shaft which carries a draw bar. The draw bar is maintained substantially perpendicular to the shaft, and the cables from the corner posts are connected to the draw bar. The cables are tensioned as the draw bar is advanced along the screw shaft by rotation of the shaft, and, since the draw bar is maintained substantially perpendicular to the shaft, each cable is tensioned uniformly. The perpendicular relationship between the draw bar and the screw shaft also provides a self-correcting feature if one of the cables should become non-uniformly stretched. The screw shaft is supported adjacent one end by a thrust bearing to provide smooth and easy operation even when the cables exert considerable tension on the shaft. The cable drawing mechanism fits compactly within the trailer frame and is substantially enclosed to protect the parts from water, mud, stones and the like which are commonly found on roadbeds, particularly in campsites.

Description of the drawings

FIG. 1 is a perspective view of the kind of camping trailer to which the invention is applicable;
FIG. 2 is a top plan view of the frame of the trailer illustrated in FIG. 1 showing the inventive cable-drawing mechanism;
FIG. 3 is a fragmentary top plan view partially in section of the cable drawing mechanism of FIG. 2;
FIG. 4 is a side elevational view partially in section of FIG. 3;
FIG. 5 is an enlarged fragmentary sectional view of the central portion of FIG. 4;
FIG. 6 is a view taken along the line 6—6 of FIG. 4;
FIG. 7 is a view taken along the line 7—7 of FIG. 4;
FIG. 8 is an elevational view of one of the nut-retaining plates;
FIG. 9 is an enlarged bottom plan view of the central portion of FIG. 3 showing the bottom surface of the draw bar;

FIG. 10 is an enlarged fragmentary view partially in section of the thrust bearing;

FIG. 11 is an end view of the thrust bearing taken along the line 10—10 of FIG. 4; and FIG. 12 is a fragmentary exploded view of an electric motor for operating the cable drawing mechanism.

Description of specific embodiment

As shown in FIG. 1, the camping trailer includes a body B, extendible bed wings W and a top T. The trailer is illustrated in its expanded camping condition. For collapsing the trailer to travel condition, as is well known in the art, the bed wings W retract by sliding in over the body B, and the top T is lowered until it covers the body B. The trailer is then in travel condition.

The perimetric body case B includes side panels which extend between the corners thereof and provide the side walls for the body case. In the illustration given, two side panels 10 and 11 are shown, and it is to be understood that the body case is completed by two other side panels which are not visible in FIG. 1. The side panels can be mounted on a supporting frame designated generally by the number 14 (FIG. 2), which extends beneath the body case adjacent its underside. The frame 12 includes longitudinally extending beams 13 and 14 which extend through the front side panel of the trailer and are brought together to form a tongue 15 which terminates in a vehicle attachment hitch 16. The frame also includes cross bars 17, 18, 19, 20, and 21. In the illustration given, the outer ends of cross bars 17 and 18 are respectively connected by the support braces 22 and 23, while the outer ends of cross bars 20 and 21 are connected by support braces 24 and 25. If desired, one end of the cross bar 19 may be connected to the cross bar 18 by brace 22a which may be an extension of the brace 22. The unconnected ends of the cross bars 18 and 19 provide a convenient location for a retractable step to facilitate entering the trailer. The frame members may be formed of suitable steel or aluminum extrusions, such as I-beams channels, hollow section bars, etc. The tongue 15 is generally triangularly shaped and includes legs 15a and 15b which extend beyond cross bar 17 adjacent the front corners of the body case.

The frame 14 is provided with a wheel-equipped under carriage, which may include the axle 26 and wheels 27 and 28.

Other support means can be provided for use with the trailer in a parked location at a campsite. As shown in FIG. 1, these can include a retractable wheel support 29 at the forward end portion of tongue 15, and adjustable jack supports 30 located beneath the corners of the body B. Auxiliary braces or supports for the bed wings W can be provided as indicated at 31.

The lift mechanism of the trailer includes cable-operated telescopic post means, which are designated generally by the number 32, one of the posts being located adjacent each corner of the trailer, as shown in FIGS. 1 and 2. As is well known in the art, the post means 32 provide a plurality of extendible and retractable telescopic sections for selectively increasing and decreasing the overall height thereof from the top of the upper post sections to the bottom of the lower post sections. The construction and operation of such telescopic posts are fully described in Pats. Nos. 123,017, 459,613 and 3,314,715 and in my co-pending application entitled Camping Trailer Lift Mechanism, Ser. No. 696,941, filed Jan. 10, 1968.

Since the particular type of telescopic post sections forms no part of my present invention, these post sections will not be described in detail. It is sufficient to say that the particular telescopic post illustrated include four post sections 32a, 32b, 32c, and 32d (FIG. 1) and that an operating cable 33 is provided for each of the posts. As shown in FIG. 2, the bottom sections of the posts are respectively mounted on the brace supports 22–25, and the main operating cables 33 for each post extend inwardly from the lower sections of the post to a central point beneath the body B. As shown in FIG. 1, the top or cover T is mounted on the tops of the upper post sections. As more fully explained in the above mentioned patents and my co-pending application, tensioning of the cables 33, i.e., movement of the cables inwardly toward the center of the body B causes the telescopic posts 32 to be fully extended to the condition illustrated in FIG. 1. When the tension is released, the sections can be returned to a collapsed, telescoping condition, and the return of the telescoping post to this collapsed condition is facilitated by the weight of the top T bearing down on the posts.

Turning now to the distinctive features of the present invention, there is provided an operating mechanism for use in combination with the campng trailer equipped with the cable-operated telescoping corner posts. As shown more clearly in FIGS. 2, 3, and 4, the operating mechanism includes a screw shaft designated generally by the number 40. The shaft 40 is rotatably mounted on frame 12, for example, cross bars 17, 18 or 19, in suitable bearings for axial rotation while remaining fixed longitudinally with respect to the frame. Shaft 40 preferably includes a threaded driven portion 41 which extends beneath the body, as shown, and a driving portion 42, which need not be threaded, which extends to a position adjacent one of the side panels, such as the front panel which extends upwardly from frame member 17. In the illustration given, the driving portion 42 terminates in an end 43, which is adapted to receive a crank. If desired, shaft sections 41 and 42 can be formed separately and detachably united by a suitable coupling 44 (FIG. 3), which is secured to the shaft sections by pins 45.

A roller support bracket 46 comprising spaced-apart upper and lower plates 46a and 46b, respectively, can be mounted centrally on the cross bar 19 for supporting roller-equipped pins 47 and 48. Each pin 47 and 48 rotatably carries a pair of super-imposed rollers for respectively receiving one of the cables 33 and guiding the cables into generally parallel alignment for attachment to draw bar 49. As can be seen best in FIG. 4, pin 47 carries rollers 47a and 47b, and the rollers may be separated by a bearing 50 of nylon or other suitable material. Similarly, pin 48 also rotatably carries a pair of superimposed rollers separated by a bearing.

The cables may extend from the bottom of each post 32 and pass through suitable openings provided in the frame members as described in my said co-pending application and around one of the rollers supported by the pins 47 and 48. The cables 33 extend from the rollers through suitable openings 19a and 19b provided in the cross bar 19 and are attached to the draw bar 49 by means to be described more fully hereinafter.

One end of the screw shaft 40 is journaled in bushing 51 suitably attached to cross bar 19, as by welding. The threaded shaft 40 is rotatably supported adjacent its other end by bushing 52 (FIG. 2) which is mounted in cross bar 17. The screw shaft 40 passes through cross bar 18 and is rotatably supported therein by a thrust bearing assembly 53. Referring to FIG. 10, the bearing assembly 53 includes a thrust nut 54 which may be threaded onto the threaded portion 41 of the screw shaft until it is properly positioned and then fixed in place by means of a retaining pin 55. The thrust nut 54 includes an elongated generally cylindrical body portion 54a and a radially enlarged end or shoulder portion 54b. The shoulder 54b abuts a ball bearing and race assembly 56 which incluudes forward and rearward races 57 and 58, respectively, and ball bearings 59. The bearing and race assembly 56 is held together by retaining cup 60 which is suitably secured to rectangular plate 61. The shoulder 54b and the bearing and race assembly 56 is enclosed by a generally box-like cover 62 which is provided with attaching flanges 62a and 62b and central opening 62c. Both the cover 62 and the plate 61 are secured to the cross bar 18 by bolts 63 and nuts (not shown).

The forward and rearward races 57 and 58 may be generally annularly shaped, and the inside diameter of each race is preferably approximately equal to the outside diameter of the body portion 54a of the thrust nut 54. The bearing and race assembly 56 thereby restrains the thrust nut and screw shaft from movement from side-to-side or up and down with respect to the trailer, and provides for smooth and easy rotation of the screw shaft even when substantial tension is exerted on the shaft by the cables 33 in the direction of the arrow in FIG. 10.

Referring to FIGS. 3–9, the draw bar means includes a standard ball nut 64 which rides on the screw shaft 41. The particular ball nut illustrated in a Saginaw No. 5709286 and includes a generally box-like casing or body portion 65 (FIG. 5), and a generally cylindrical extension 66. The ball nut 64 is provided with a central bore 67 which extends perpendicularly to the flat end 65a of the body portion 65 and which is provided with a helical groove 68 within the body portion 65. The helical groove 68 is provided with the same pitch as the screw shaft 41, and the helical groove and the groove provided by the threads of the screw shaft cooperate to provide a spiral passage for a plurality of ball bearings 69. As is well known, the ball bearings 69 travel from one end of the spiral passage as at 69a, to the other end of the passage as at 69b. When the bearings reach one end of the passage they are returned to the other end by a return channel 70 (FIG. 4). The rotation of the shaft and the cooperation of the ball bearings between the shaft and the ball nut advance the ball nut along the shaft in a very smooth manner. The ball bearings provide a relatively tight fit between the ball nut and the shaft to maintain the ball nut and the shaft in axial alignment and to substantially prevent transverse movement of the ball nut with respect to the shaft while at the same time permitting the ball nut to travel smoothly and easily as the screw shaft is rotated. Although a ball nut is used in the particular illustration given, it is to be understood that an ordinary nut or internally threaded member may also be used.

The draw bar 49 is seen to be channel-shaped and includes a web portion 71 and a pair of side walls 72 and 73 which extend toward the rollers carried by the pins 47 and 48. The web portion 71 is provided with a central opening 71a which receives the shaft 41, and the side walls 72 and 73 are spaced apart a distance approximately equal to the vertical dimension of the body portion 65 of the ball nut (see especially FIG. 5). The axial dimension of the body portion 65 is approximately equal to the depth of the draw bar 49, that is, the distance between the web portion 71 and the edges 72a and 73a, respectively, of the side walls 72 and 73. The diameter of the extension 66 of the ball nut is less than the horizontal dimension of the body portion 65 to provide a flat shoulder 74 (FIG. 9) and the vertical dimension of the ball nut may also be somewhat greater than the diameter of the extension 66 to provide a flat shoulder 75 (FIG. 5) adjacent the edges 72a and 73a of the side walls of the draw bar. Both of the shoulders 74 and 75 extend perpendicularly with respect to bore 67.

A pair of nut-retaining plates 76a and 76b (FIGS. 5, 7, and 8) are inserted between the side walls of the draw bar 49 and bear against the shoulders 74 and 75 of the ball nut to hold the ball nut securely against the web portion 71 of the draw bar. As can be seen best in FIGS. 7 and 8, each nut-retaining plate includes a pair of openings 77 and 78 and an arcuate edge 79 which is positioned adjacent the cylindrical extension 66 of the ball nut. The axial dimension of the body portion 65 of the ball nut is less than the depth of the draw bar channel so that, in assembling the draw bar means, after the ball nut is received by the draw bar channel, the nut-retaining plates are pushed against the shoulders 74 and 75 and moved toward the web portion of the channel until the ball nut is held firmly against the web portion. The nut-retaining plates are then held in this position until they are welded to the side walls of the draw bar as at 80.

The flat end 65a of the body portion 65 of the ball nut is maintained in substantial bearing contact with the flat web portion 71, and the flat shoulders 75 and 76 are maintained in substantial bearing contact with the flat retaining plates 76a and 76b. The web portion is thereby maintained in a substantially perpendicular relationship with respect to the central bore 67 of the ball nut. By virtue of the secure fit of the ball nut on the screw shaft, the draw bar channel is also maintained in a substantially perpendicular relationship to the screw shaft.

The cables 33 are anchored to the draw bar 49 by means of eye hooks 81. The eye hooks are provided with threaded ends 82 (FIG. 9) which are inserted through the openings 77 and 78 in the nut-retaining plates 76a and 76b and through suitable openings provided in the web portion 71 of the draw bar and secured against withdrawal by lock nuts 83. The threads of the lock nuts 83 preferably slightly deformed to interfere with the threads of the eye hooks so that the nuts can be moved only with a wrench. The eye hooks 81 extend from the web portion toward the rollers carried by the pins 47 and 48, and the ends of the cables 33 are passed through the openings of the hooks and secured by clamps 84.

Referring to FIGS. 3 and 4, a pin 85 may be inserted through the shaft to act as a positive stop when the top of the trailer has been lowered to the travel condition. When the top has been lowered, the extension 66 of the ball nut will bear against the pin 85, preventing further movement to the left in FIG. 4 and consequent slackening of the cables 33.

The thrust nut 54 serves as a positive stop for the draw bar 49 after the top of the trailer has been raised to the camping condition.

A guide channel 86 extends between cross bars 18 and 19 and includes side walls 87 and 88 and web 89 (FIGS. 6 and 7). The side walls 87 and 88 are spaced apart slightly greater than the length of the draw bar 49, and the guide channel 86 is secured to the cross bars 18 and 19 so that the web 89 is spaced slightly below the bottom side wall 73 of the draw bar channel. Nylon glides 90 are carried by the bottom side walls 73 of the draw bar adjacent the ends thereof. When the screw shaft is rotated in either direction, one of the nylon glides 90 will bear against the web 89 of the guide channel and prevent any tendency of the draw bar to rotate with the shaft. The nylon glides may be secured to the draw bar by providing the glides with stud ends 91 (FIG. 7) which may be inserted through suitable openings in the bottom side wall 73. The stud ends 91 may be provided with heads which engage the upper surface of the side walls 73 to prevent inadvertent removal of the glides.

Referring to FIG. 3, the guide channel 86 may be removably secured to the cross bars 18 and 19 by providing the ends of the guide channel with attaching flanges 92 which may be secured to the cross bars by bolts 93 and nuts 94. The guide channel 86 not only guides the draw bar 49 as it moves along the screw shaft and prevents the draw bar from rotating, but shields the shaft, draw bar, and ball nut from mud, water, and foreign objects which can be splashed or thrown up from the road as the travel trailer is pulled.

Operation

The cables 33 are secured to the eye hooks 79 when the trailer top is lowered or in the travel condition. Before the cable hooks are secured, the draw bar 49 is moved toward the cross bar 19 until further movement is prevented by the stop pin 85. The eye hooks 81 are secured to the draw bar 49 by screwing the nuts 83 onto the threaded ends of the eye hooks just enough to engage the nuts on the threads. The ends of the cables 33 are passed through the eye hooks and secured by the clamps 84.

The screw shaft is then rotated to advance the draw bar 49 toward the cross bar 18, and this rotational movement may be imparted by a hand crank engaged with the shaft end 43 which extends through the front wall of the trailer (FIG. 2). The particular screw shaft illustrated has a right hand thread, and by rotating the shaft clockwise as viewed in FIG. 6 the draw bar 49 will be advanced toward the cross car 18. As the draw bar advances, the cables 33 are drawn away from the telescopic posts 32 to raise the posts and the trailer top in the manner described in Pats. Nos. 133,017, 459,613, and 3,314,715 and my co-pending application entitled Camping Trailer Lift Mechanism, Ser. No. 696,941, filed Jan. 10, 1968.

The draw bar 49 may be advanced until it abuts the thrust nut 54. The trailer top T is then measured to determine the additional distance, if any, it must be raised in order to reach its fully raised position. The particular telescopic posts illustrated include four telescopic sections 32a–32d, and, accordingly, for every inch the main operating cables are drawn away from the posts, the trailer top will be raised three inches. When the additional distance that the top T must be raised to achieve its fully raised height is determined, this distance is divided by 3, and the nuts 83 which secure the eye hooks to the draw bar are tightened to pull the eye hooks and cables toward the cross bar 18 by this amount. The end of the thrust nut 54 stops the draw bar 49 a sufficient distance from the cross bar 18 to facilitate this tightening operation, or the draw bar may be backed off from the cross bar 18 before the nuts 83 are tightened. The draw mechanism will then be set to automatically raise and lower the trailer top to its fully raised and fully lowered positions as the draw bar moves between the upper stop provided by the thrust nut 54 and the lower stop provided by the stop pin 85, the distance between these stops being equal to approximately ⅓ of the distance which the telescopic posts 32 move from their lowered or telescoped positions to their fully extended positions. If more or less telescoping sections are used, the distance between the stops would be proportionately less or greater than the distance which the top moves.

After the initial factory adjustment of the eye hooks, the guide channel 86 may be secured to the cross bars 18 and 19.

It will be appreciated that as the draw bar 49 is advanced along the shaft away from the lower stop pin 85 to raise the top, considerable tension may be exerted by the cables 33 on the draw bar 49 and the shaft 41 tending to pull the shaft toward the cross bar 19. However, the thrust bearing assembly 53 ensures that the screw shaft may be rotated smoothly and easily.

Although the draw bar 49 may have a tendency to rotate with the shaft 41, one or the other of the nylon glides 90 will engage the web 89 of the guide channel to restrain this rotation and maintain the draw bar in a substantially horizontal position. The nylon glides 90 provide a suitable bearing contact between the draw bar and the guide channel and permit the draw bar to move smoothly along the guide channel without scraping or gouging which might occur if the edges of the draw bar were permitted to engage the channel.

As the draw bar 49 advances along the screw shaft, the secure engagement of the draw bar channel on the ball nut and the tight threaded engagement of the ball nut with the screw shaft ensure that the web portion 71 of the draw bar channel will always remain substantially perpendicular with respect to the shaft 41. Each cable 33 will thereby be advanced equally, and each of the corner posts 32 will be raised an equal amount. The trailer top T will therefore be maintained in a generally horizontal position as it is raised, and canting of the top will be substantially eliminated.

It is anticipated that the cables will become somewhat stretched through normal use, as considerable tension is applied to the cables as the top is raised and maintained in its camping condition. However, each of the operating cables will be stretched equally, and the trailer top will remain level.

Eventually, the cables may become so stretched that the trailer top will still be somewhat below its fully raised position when the draw bar 49 reaches the upper stop provided by the thrust nut. Accordingly, it may be desirable from time to time to adjust the raised position of the top, and such adjustment is an easy matter with the inventive operating mechanism. The guide channel 86 may be removed from the cross bars 18 and 19 by removing the bolts 93, and the eye hooks 81 may be advanced toward the cross bar 18 by tightening the nuts 83. Again, the spacing between the draw bar 49 and the channel 18 provided by the thrust nut 54 facilitates this tightening operation. The nuts 83 are tightened until each eye hook is advanced ⅓ the distance necessary to raise the top to its fully raised position. This tightening operation can be facilitated by tightening the eye hooks when the top is in the lowered position and the tension on the cable 33 is relaxed.

Even though the end of each of the cables 33 is advanced uniformly by the draw bar, it may happen that one of the cables becomes stretched more than the others. For example, one of the telescopic posts may be required to support more weight than the others, as when a child hangs from a corner of the trailer top or when a heavy object is placed on the top as it is being raised. If one cable is stretched more than the others, the corner of the trailer top that is supported by the telescopic post associated with that cable may be somewhat lower than the other posts and cause canting of the top. However, I have found that this condition is self-correcting with my draw mechanism. For example, assume that the cable designated 33a in FIG. 3 has been stretched more than the other three cables. When the trailer top is in the lowered position, the ball nut 64 abuts the lower stop pin 85. As the draw bar is advanced toward the right to raise the top, the other cables will be tensioned before cable 33a since the cable 33a is somewhat longer than the others. The draw bar 49 is always maintained perpendicular with respect to the screw shaft 41 and will not tilt to compensate for the additional tension being applied by the cables attached to the lower half of the draw bar, and the channel shape of the draw bar provides a strong construction which will not readily deform. The other three cables are therefore tensioned before cable 33a, which will not be tensioned until the draw bar is advanced a sufficient distance to take up the slack therein. After the top is raised several times from its lower position, the other three cables, by virtue of this "pre-stressing," will eventually become stretched to the same extent as cable 33a, and the top will again become level. The several raising operations necessary to uniformly stretch the cables need not be performed purposely, as the normal raising and lowering of the top as the trailer is used will provide the necessary tensioning of the unstretched cables.

When the draw bar 49 is moved toward the channel 19 to lower the top, the draw bar will be prevented from moving too far after the top has been lowered by the lower stop pin 83. The draw bar 49 will thus be prevented from continuing to move toward the cross bar 19 to create excessive slack in the operating cables. Such slack in the cables between the draw bar and the telescopic posts 32 is undesirable, as drooping cables may snag on objects lying in the road or become abraded by dragging.

Referring to FIGS. 2 and 12, a high-torque stub shaft 95 extends through front side panel 96 of the trailer which extends upwardly from frame cross bar 17. The shaft 95 is rotatably mounted in support bar 97 which also extends upwardly from cross bar 17 behind the front panel 96. A sprocket 98 is carried by the shaft 95 behind panel 96, and the sprocket 98 is operatively connected to a sprocket 99 carried by screw shaft 40 adjacent the end 43 by chain 100. Preferably the chain engaging portions of the sprockets 98 and 99 are of appreciably different sizes, for example, sprocket 98 can be formed with a substantially larger diameter than sprocket 99. To provide the desired speed variation in the raising and lowering of the top, the sprocket 98 can have a diameter of from 2 to 4 times or more the diameter of sprocket 99. The shaft end 43 and the shaft 95 extend through the front panel and are adapted to engage a suitable hand crank.

The screw shaft 40 lies generally in the plane of the frame 12 formed by the frame members 13, 14, 17–21, and extends centrally of the body of the trailer so that the shaft end 43 is about equidistant from the front corners of the body case. Thus not only do the sprocket 99 and shaft 95 provide a high-speed means for raising and lowering the top, but they provide a more accessible and convenient position at which to connect the operating hand crank. The shaft 95 is positioned upwardly from shaft end 43 and toward one of the front corners of the body. In the illustration given, the shaft 95 is generally above the tongue leg 15a, and a person may crank the shaft 95 without having to step over the tongue leg and without excessive stooping.

If desired, an electric motor 101 may be provided for automatically rotating the shaft 95. The motor may be a standard electric motor which is adapted for battery operation, and the battery of the car used to pull the trailer or a battery mounted on the trailer itself may be used to power the motor. The motor 101 may be conveniently mounted adjacent the front wall 96 of the trailer on the tongue leg 15a by means of a generally L-shaped angle bracket 102. The horizontal portion of the bracket 102 is secured to the tongue by U bolts 103, and the motor is secured to the vertical portion of the bracket by bolts 104. Driving shaft 105 of the motor extends through the bracket 102 and receives a suitable coupling member 106 which is adapted to lockingly engage the shaft 95. Motor housing 107 encloses the motor 101 and is suitably secured to the bracket.

The motor 101 may also be mounted adjacent the main shaft end 43 for connection thereto if the high-torque shaft 95 is not used. Alternatively, the shaft end 43 may be eliminated, and the only opening in the front wall may be for the shaft 95.

While in the foregoing specification I have described my invention in considerable detail in relation to a preferred embodiment thereof, and certain details have been set forth for the purpose of illustration, it will be apparent that the invention is susceptible to additional embodiments and that certain of the details described herein can be varied considerably without departing from the basic principles of the invention.

I claim:

1. In a camping trailer having a frame, a top, a plurality of upwardly extending telescopic posts on said frame adapted to support said top, a draw cable for each post for raising and lowering said post, an improved draw means for substantially simultaneously drawing said cables to raise said top, said draw means comprising an elongated screw shaft rotatably mounted on said frame, draw bar means including a draw bar extending transversely of said shaft, said draw bar means being threadedly engaged with said shaft to maintain said draw bar substantially perpendicular to said shaft, one end of said shaft being journaled in said frame, said shaft being rotatably supported adjacent its other end by thrust bearing means mounted on said frame, said thrust bearing means including a thrust nut received on said shaft and provided with a radially enlarged shoulder, ball bearing means carried by said frame between said radially enlarged shoulder and said draw bar means, said radially enlarged shoulder bearing against said ball bearing means when said draw bar is advanced, whereby rotation of said shaft in one direction advances said draw bar to raise said top and rotation in the other direction lowers said top.

2. In a camping trailer having a frame, a top, a plurality of upwardly extending telescopic posts on said frame adapted to support said top, a draw cable for each post for raising and lowering said post, an improved draw means for substantially simultaneously drawing said cables to raise said top, said draw means comprising an elongated screw shaft rotatably mounted on said frame, a generally channel-shaped draw bar having a web portion and a pair of side walls, said web portion extending transversely of said shaft and being provided with an opening to receive said shaft, each of said side walls including an edge spaced axially from said web portion and extending generally transversely of said shaft, a nut provided with a central bore to receive said shaft and being threadedly engaged with the shaft, said nut being received between said side walls of the draw bar and extending axially from said web portion toward said side wall edges and being provided with shoulder means adjacent said side wall edges, retaining means secured to each of said side walls and extending therebetween, said retaining means engaging said shoulder means to maintain substantial bearing contact between the nut and said web portion and between said shoulder means and said retaining means, said cables being attached to said draw bar, whereby rotation of said shaft in one direction advances said draw bar to raise said top and rotation in the other direction lowers said top.

3. The structure of claim 2 wherein said frame includes a plurality of upwardly extending side panels, said screw shaft extending to a position adjacent one of the side panels, an electric motor mounted on said frame adjacent said one side panel, said motor including a driving shaft, and means for connecting said driving shaft to said screw shaft whereby rotation of said driving shaft rotates said screw shaft.

4. The structure of claim 2 including a guide channel extending adjacent to the screw shaft and secured to the frame, said guide channel having a web portion disposed below said screw shaft and said draw bar and spaced to restrain rotation of said draw bar.

5. The structure of claim 2 in which said nut is a ball nut provided with a plurality of ball bearings carried by a helical groove in the bore of said nut, the threaded engagement between said nut and said shaft being provided by said ball bearings.

6. The structure of claim 2 including an eye hook for each of said cables, each of said hooks having a threaded end received by an opening in said web portion, each of said hooks extending from said web portion and being secured against withdrawal therefrom by a nut threadedly engaged with said threaded end, each of said cables being attached to one of said hooks.

7. The structure of claim 2 wherein said frame includes a plurality of upwardly extending side panels, said screw shaft extending to a position adjacent one of said side panels, first sprocket means fixedly mounted on the panel-adjacent end of said screw shaft, second sprocket means operably associated with said first sprocket means and including a stub shaft mounted for rotation adjacent said one panel, said stub shaft having an outer end portion accessible from outside said panel and adapted to receive a manual operating crank for turning said stub shaft.

8. The structure of claim 7 wherein the panel-adjacent end of said screw shaft is accessible from outside said panel and is adapted to receive a manual operating crank for directly turning said shaft.

9. The structure of claim 7 wherein said first sprocket means is positioned generally equidistant from the pair of corners of said body case associated with said panel, said second sprocket means being positioned upwardly and toward one of said pair of corners with respect to said first sprocket means.

10. The structure of claim 7 wherein said first and second sprocket means are sized relative to each other so that said screw shaft and said stub shaft will rotate at different speeds.

References Cited

UNITED STATES PATENTS 3,314,715 4/1967 Bontrager _____ 296—23
3,321,876 5/1967 Birkenheuer.

PHILIP GOODMAN, Primary Examiner

U.S. Cl. X.R.

52—66; 296—27